US009167944B2

(12) United States Patent
Conrad

(10) Patent No.: US 9,167,944 B2
(45) Date of Patent: Oct. 27, 2015

(54) CONSTRUCTION TECHNIQUE FOR A DOMESTIC APPLIANCE SUCH AS A SURFACE CLEANING APPARATUS

(75) Inventor: Wayne Ernest Conrad, Hampton (CA)

(73) Assignee: Omachron Intellectual Property Inc., Hampton, Ontario ( * ) Notice: Subject to any disclaimer, the term of this patent is extended or adjusted under 35 U.S.C. 154(b) by 870 days.

(21) Appl. No.: 12/846,131

(22) Filed: Jul. 29, 2010

(65) Prior Publication Data

US 2011/0027011 A1    Feb. 3, 2011

(30) Foreign Application Priority Data

Jul. 30, 2009  (CA) .................................. 2674380

(51) Int. Cl.
*A47L 9/24*          (2006.01)
*F16B 7/04*          (2006.01)

(52) U.S. Cl.
CPC ............... *A47L 9/244* (2013.01); *F16B 7/0426* (2013.10); *Y10T 403/32475* (2015.01)

(58) Field of Classification Search
CPC ......... A47L 9/242; A47L 9/244; A47L 9/248; F16B 7/0426
USPC ........ 285/7, 31, 145.1, 282, 298, 302, 84, 29, 285/82; 15/315, 410, 414
See application file for complete search history.

(56) References Cited

U.S. PATENT DOCUMENTS

| | | | | |
|---|---|---|---|---|
| 3,676,986 A | * | 7/1972 | Reiling | ............................ 55/472 |
| 4,018,493 A | * | 4/1977 | Lyman et al. | ................. 439/195 |
| 4,079,965 A | * | 3/1978 | Moughty et al. | ................... 285/7 |
| 4,345,805 A | * | 8/1982 | Finley et al. | ................... 439/191 |
| 4,669,755 A | * | 6/1987 | Harris et al. | ....................... 285/7 |
| 6,370,730 B1 | * | 4/2002 | Young et al. | ................. 15/327.1 |
| 7,300,077 B2 | * | 11/2007 | Tawara et al. | ................. 285/417 |
| 2004/0078925 A1 | * | 4/2004 | Evans | ............................. 15/414 |
| 2010/0001511 A1 | * | 1/2010 | Canale | ............................... 285/7 |

* cited by examiner

*Primary Examiner* — James Hewitt
(74) *Attorney, Agent, or Firm* — Philip C. Mendes da Costa; Bereskin & Parr LLP/S.E.N.C.R.L., s.r.l.

(57) ABSTRACT

An appliance or domestic apparatus such as a surface cleaning apparatus comprises a first part and a second part. The second part comprises an insertion portion slidably insertable into the first part to define an inserted position. The insertion portion comprises a longitudinal axis and a first detent member. A movable lock is slidably mounted on at least one of the first part and the second part, and is slidable at an angle to a longitudinal axis of the insertion portion. The movable lock has a second detent member. When the insertion portion is in the inserted position, the first detent member is positioned inwardly of the second detent member, and the second detent member is selectively positionable to interact with the first detent member to lock the first part to the second part.

16 Claims, 9 Drawing Sheets

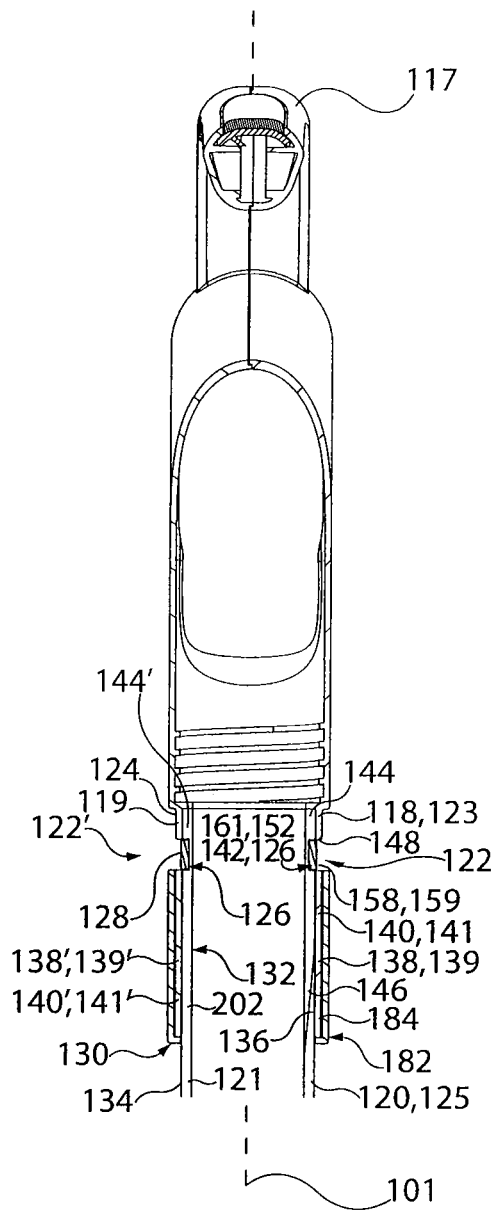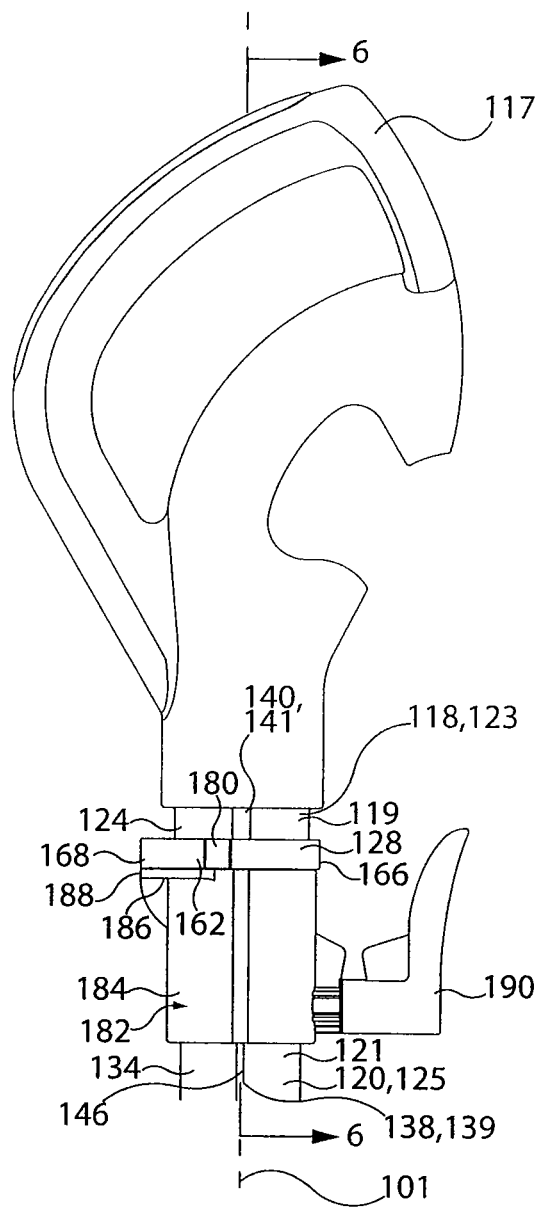
Fig. 6
Fig. 5

CONSTRUCTION TECHNIQUE FOR A DOMESTIC APPLIANCE SUCH AS A SURFACE CLEANING APPARATUS

FIELD

The specification relates to domestic apparatuses or appliances, such as power tools, air cleaners, garden tools, pressure washers and surface cleaning apparatuses, preferably to apparatuses or appliances that have a fluid flow path therein that is to be connected to another component part such as air cleaners, pressure washers and surface cleaning apparatus and in a particularly preferred embodiment to surface cleaning apparatuses. Particularly, the specification relates to domestic apparatuses that have parts that are secured together by a slidable lock.

INTRODUCTION

The following is not an admission that anything discussed below is prior art or part of the common general knowledge of persons skilled in the art.

Domestic apparatuses or appliances typically have components or accessories that may be added or removed to alter the utility of the domestic apparatuses or appliances. For example, a vacuum cleaner may have an above floor cleaning and that is removably mounted to an air flow path in the vacuum cleaner.

Various connectors for detachably securing components of appliances together are known. A typical connector comprises a spring loaded detent provided on an insertion portion and a mating opening provided in the receiving portion. In order to secured the parts together, the insertion portion is inserted into the receiving portion and the detents moved to a retracted position. The insertion portion is moved until the detents are aligned with the mating openings. The detents then extend into or through the openings and the parts are secured together.

SUMMARY

The following summary is provided to introduce the reader to the more detailed discussion to follow. The summary is not intended to limit or define the claims.

In accordance with an aspect of this invention, components of an apparatus are releasably secured together by a lock that is slideably mounted to an exterior surface of a receiving part. The lock is preferably moveable in a direction that is perpendicular to the removal direction of the insertion part from the receiving part. An advantage of this design is that the lock is easily manipulated even by users with limited dexterity. For example, the lock is operable without requiring a detent member to be manually inserted through an opening.

In accordance with another aspect of this invention, the lock may comprise a moveable part that may be integrally molded as a single annular component that is configured to interact with an opening provided on the receiving portion and a detent provided on the insertion portion. In a preferred embodiment, the annular lock may be mounted over the receiving portion. The annular lock has a length that is longer then the diameter of the receiving portion. Therefore, the lock may be moved laterally forwardly and rearwardly between a locked and an unlocked position and this may permit one handed operation of the lock. Further, as a user may merely have to push on a side of the annular lock, the lock may be used by a user with limited dexterity.

According to one broad aspect, an appliance or domestic apparatus is provided. The appliance or domestic apparatus comprises a first part and a second part. The second part comprises an insertion portion slidably insertable into the first part to define an inserted position. The insertion portion comprises a longitudinal axis and a first detent member. A movable lock is slidably mounted on at least one of the first part and the second part, and is slidable at an angle to a longitudinal axis of the insertion portion. The movable lock has a second detent member. When the insertion portion is in the inserted position, the first detent member is positioned inwardly of the second detent member, and the second detent member is selectively positionable to interact with the first detent member to lock the first part to the second part.

In some embodiments, the movable lock is slidably mounted on the first part, for example on an outer surface of the first part.

In some embodiments, the second part is non-rotatably mounted to the first part when the second part is inserted into the first part.

In some embodiments, the first part comprises a longitudinal wall having an opening, and a portion of the movable lock is slidable across the opening as the movable lock is moved to a locked position.

In some embodiments, first part comprises a longitudinal wall having an opening, the insertion portion comprises a detent-receiving portion, and the second detent member is slidable into the opening and detent-receiving portion to interact with the first detent member when the lock is moved to the locked position.

In some embodiments, the second part comprises a wall having an outer surface, and the detent-receiving portion comprises a recess provided in or adjacent the outer surface In some embodiments, the second part has an outer surface having an anti-rotation member provided thereon and the first part has a mating anti-rotation member.

In some embodiments, the anti-rotation member comprises a longitudinally extending spline provided on the outer surface. A portion of the spline may provide the first detent member. The spline may comprise a first portion and a collinear second portion and a gap therebetween, and an end face of the first portion may provide the first detent member. The gap may comprise a detent-receiving portion into which the second detent member is slidable to interact with the first detent member In some embodiments, the mating anti-rotation member comprises a mating recess defined in an inner surface of the first part.

In some embodiments, the movable lock is movable between a locked position wherein the second detent member interacts with the first detent member, and an unlocked position wherein the second detent member does not interact with the first detent member. The movable lock may comprise a lock recess collinear with the mating recess when the movable lock is in the second position.

In some embodiments, when the movable lock is in the locked position, the lock recess is laterally spaced from the mating recess, and the second detent member is aligned with the mating recess.

In some embodiments, the lock recess is adjacent the second detent member.

In some embodiments, the moveable lock is an annular band.

In some embodiments, the moveable lock may comprise first and second opposed actuation portions.

In some embodiments, the lock may be the moveable lock is slidable laterally in a first direction for movement of the moveable lock from a locked position to an unlocked position and the moveable lock is slidable laterally in the opposite direction for movement of the moveable lock from the unlocked position to the locked position.

In some embodiments, one of the first part and the second part comprises a lock actuation blocker and preferably the first part. The lock actuation blocker may comprise a flange adjacent the movable lock and having an outer edge adjacent an end of the movable lock when the movable lock is in the locked position.

In some embodiments, the second part is a fluid flow conduit.

In some embodiments, the appliance or domestic apparatus is a surface cleaning apparatus.

DRAWINGS

Reference is made in the description to the accompanying drawings, in which:

FIG. 5 is a side view of the first part, second part, and movable lock of FIG. 4, showing the lock in the locked position;

FIG. 6 is a cross section taken along line 6-6 in FIG. 5;

DESCRIPTION OF VARIOUS EMBODIMENTS

Various apparatuses or methods will be described below to provide an example of each claimed invention. No example described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention.

Figure 1:
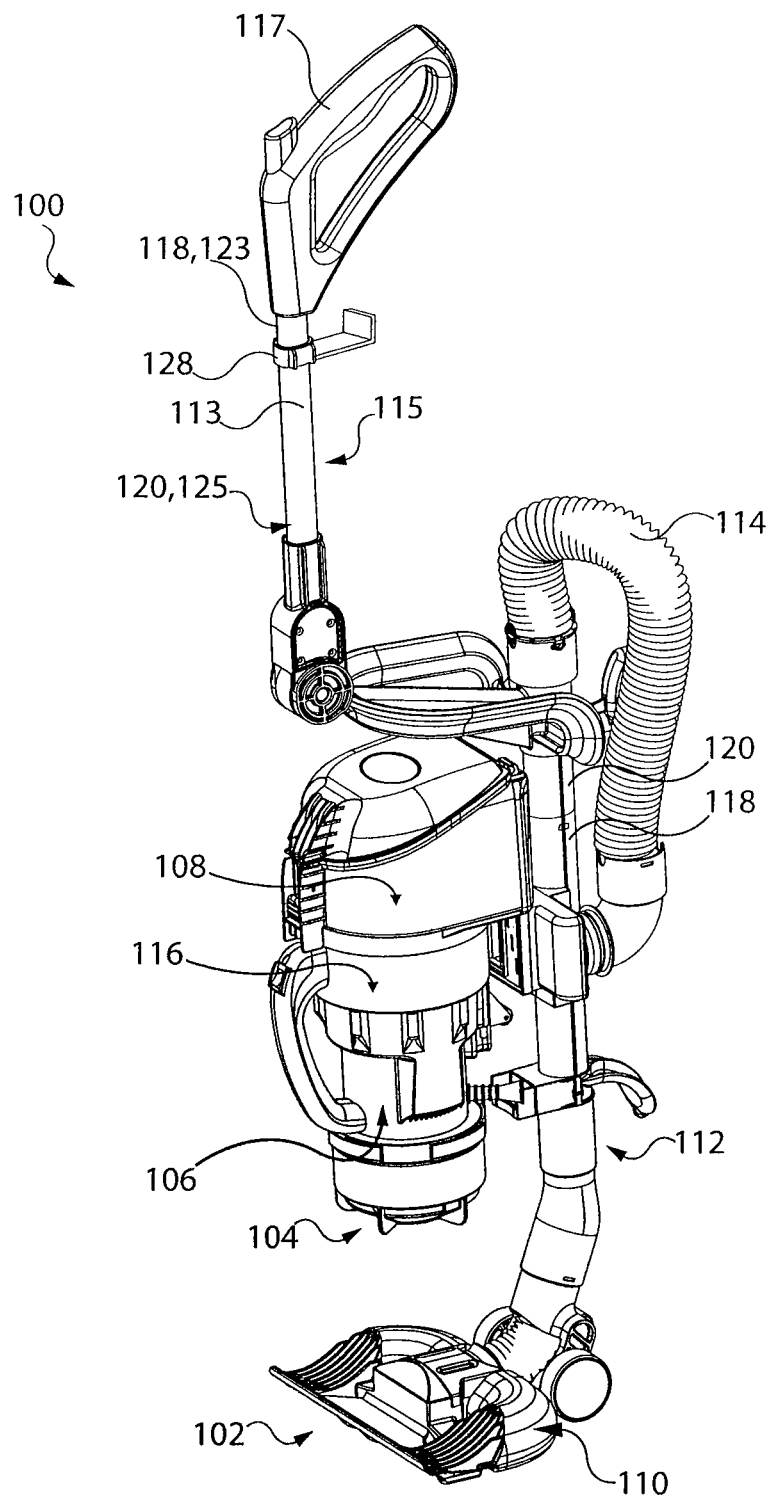
FIG. 1 is a perspective illustration of a surface cleaning apparatus comprising a first part, a second part, and a movable lock.

Referring to FIG. 1, a domestic apparatus 100 is shown. In the embodiment shown, the domestic apparatus 100 is a surface cleaning apparatus 100, and more particularly, an upright vacuum cleaner 100. In alternate embodiments, the surface cleaning apparatus may be, for example, a hand vacuum cleaner, a carpet extractor or cleaner, a canister type vacuum cleaner, a wet-dry vacuum cleaner, a central vacuum cleaner, or any other type of surface cleaning apparatus. In further alternate embodiments, the domestic apparatus may be, for example, a power tool, an air cleaner, a garden tool, a pressure washer, or any other type of appliance. Preferably, domestic apparatus 100 has an air flow conduit and one of the parts secured in position by a key comprises a fluid flow conduit.

Referring still to FIG. 1, in the embodiment shown, the surface cleaning apparatus 100 comprises a fluid flow path (not shown), which includes a dirt inlet 102 and a clean air outlet 104. A suction motor 106 and a treatment member 108 are provided in the fluid flow path. The treatment member may be any suitable member, which removes particulate matter from a fluid, and preferably from air, such as a filter bag, or a cyclonic cleaning unit. It will be appreciated that the dirt inlet 102, the clean air outlet 104 and the suction motor 106 may be of any design and the fluid flow path may alternately be a flow path in an apparatus without a clean air inlet or a dirty air outlet (e.g., if a fluid is recycled within the appliance).

In the embodiment shown, the dirt inlet 102 is provided in a surface cleaning head 110. An upflow duct 112 extends upwardly from the surface cleaning head, downstream of the dirt inlet 102, and is in communication with a flexible hose 114. A cleaning unit housing 116 is mounted to the upflow duct 112, and includes the suction motor 106 and the treatment member 108. The flexible hose 114 is in communication with the treatment member 108, and the suction motor 106 is downstream of and in communication with the treatment member 108. The clean air outlet 104 is downstream of the suction motor 106. A handle unit 115 is mounted to the upflow duct 112. The handle unit comprises a handle extension 113, and a handgrip 117.

Referring still to FIG. 1, the surface cleaning apparatus comprises a first or receiving part 118 and a second or insertion part 120, which are locked together. In the embodiment shown, the first part 118 and the second part 120 form part of the handle extension 113. Specifically, the first part 118 is an upper arm 123 of the handle extension 113, and the second part 120 is a lower arm 125 of the handle extension 113.

In alternate embodiments, one or both of the first part and the second part may form part of the airflow path. For example, the first part 118 and the second part 120 may each be airflow conduits, which form part of the upflow duct 112. In alternate embodiments, one or both of the first part and the second part may be support structure of the surface cleaning apparatus. For example, the first part 118 may be a hollow connector into which two air flow conduits may be inserted, e.g., upflow duct 112 and second part 120 as exemplified in FIG. 1. When the second part 120 is mounted in the first part 118, the second part 120 forms part of the airflow path. The first part 118 permits upflow duct 112 and the second part 120 to be in air flow communication when each is inserted into the first part 118. For example, the conduits may abut each other or face each other when inserted into the first art 118. The contact between the outer surface of the second part 120 and the inner surface of the first part 118 may define, by themselves or with a gasket or the like, a relatively tight fluid flow seal thereby preventing fluid from leaking out of the flow path. In a preferred embodiment, the use of the lock as disclosed herein is used with the portion of the fluid flow path upstream of the suction motor 106. Accordingly, if there is a leak, air will flow into the fluid flow path as opposed to a fluid leaking out of the connection. The first and second parts 118, 120 may have a sliding or running fit and optionally a location fit or an interference fit.

Figure 2:
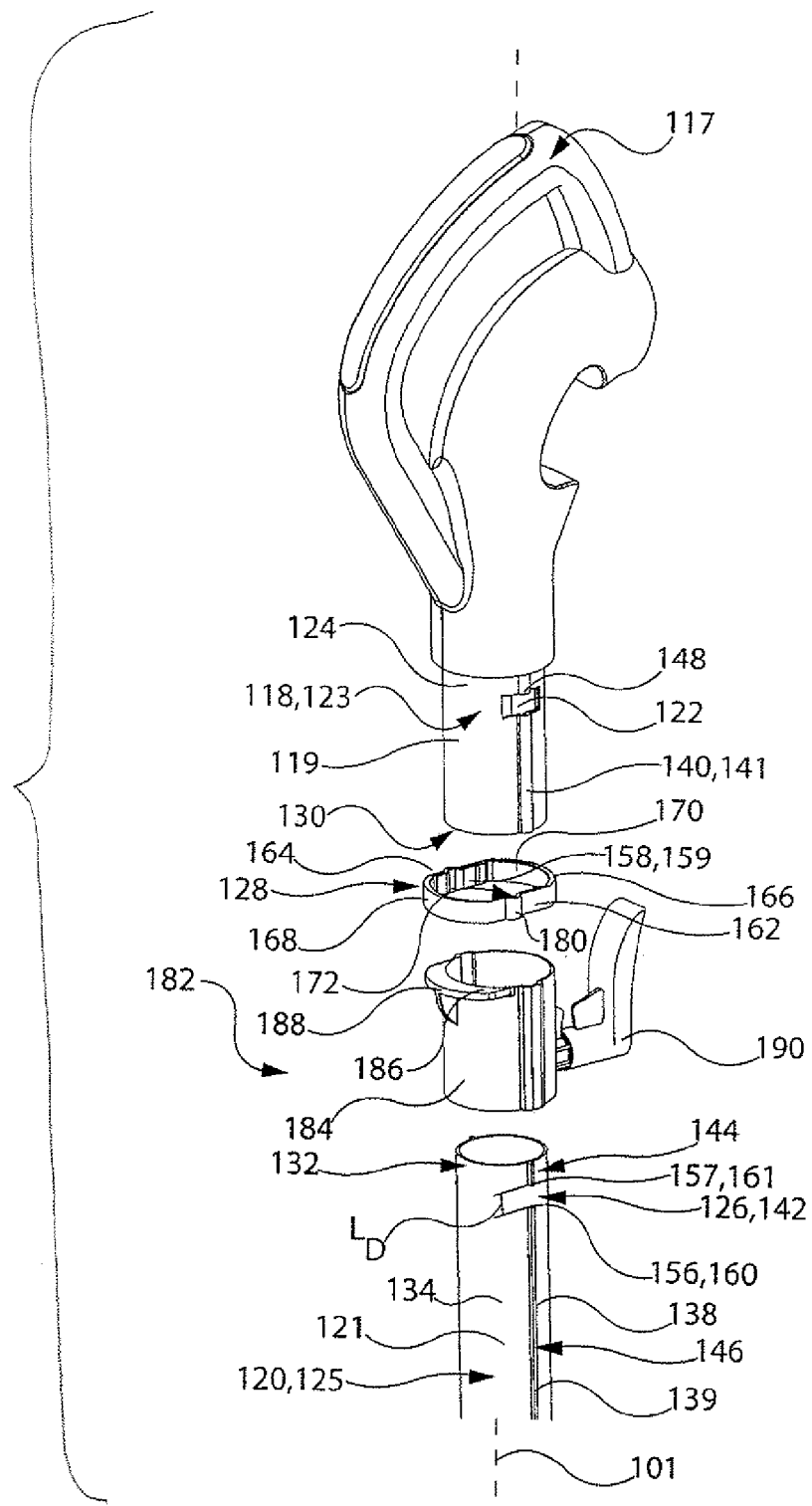
FIG. 2 is an perspective exploded view of the first part, second part, and movable lock of FIG. 1, shown with an alternate handgrip.

Accordingly, the lock may be used to releasably secure together various components, such as cleaning head 110 to upflow duct 112, upflow duct 112 to part of an upright assembly, a hand grip to an end of a cleaning wand, as exemplified in FIG. 2, or a cleaning wand to a part of an upright assembly as exemplified in FIG. 1.

Referring now to FIGS. 2 to 11, as mentioned hereinabove, the first part 118 and the second part 120 are lockable together. Specifically, as will be described in more detail hereinbelow, the second part 120 comprises an insertion portion 132 having a longitudinal axis 101. The insertion portion 132 is slidably insertable into the first part 118 to define an inserted position (shown in FIG. 4). The insertion portion 132 comprises a first detent member 157 and optionally another detent member 156. A movable lock 128 is slidably mounted on at least one of the first part 118 and the second part 120. The movable lock 128 is slidable at an angle to a longitudinal axis 101 of the insertion portion 132. The movable lock 128 has a second detent member 158 provided on an inner surface thereof (see for example FIG. 11). When the insertion portion 132 is in the inserted position, the detent member 157 is positioned inwardly of the second detent member 158 (i.e., in the longitudinal direction of insertion), and the second detent member 158 is selectively positioned to interact with the detent member 157 to lock the first part 118 to the second part 120 by preventing outward motion of the second part 120 out of the first part 118. Similarly, when the insertion portion 132 is in the inserted position, the first detent member 157 is positioned outwardly of the second detent member 158 (i.e., proximal the entrance to first part 118), and the second detent member 158 is selectively positioned to interact with the first detent member 157 to lock the first part 118 to the second part 120 by preventing inward motion of the second part 120 into the first part 118. If a stop is not provided to limit inward movement of the second part 120 into the first part 118, then it is preferred to provide both detent members 156 and 157 such that second detent member 158 may be held therebetween.

By securing the first part 118 and the second part 120 together in this manner, the first part 118 and the second part 120 may be secured together relatively tightly and securely, while being easily detachable. Further, in embodiments wherein one or both of the first part 118 and the second part 120 form part of the airflow path (not shown) securing the first part 118 and the second part 120 together in this manner may still allow air to flow therethrough.

Figure 3:
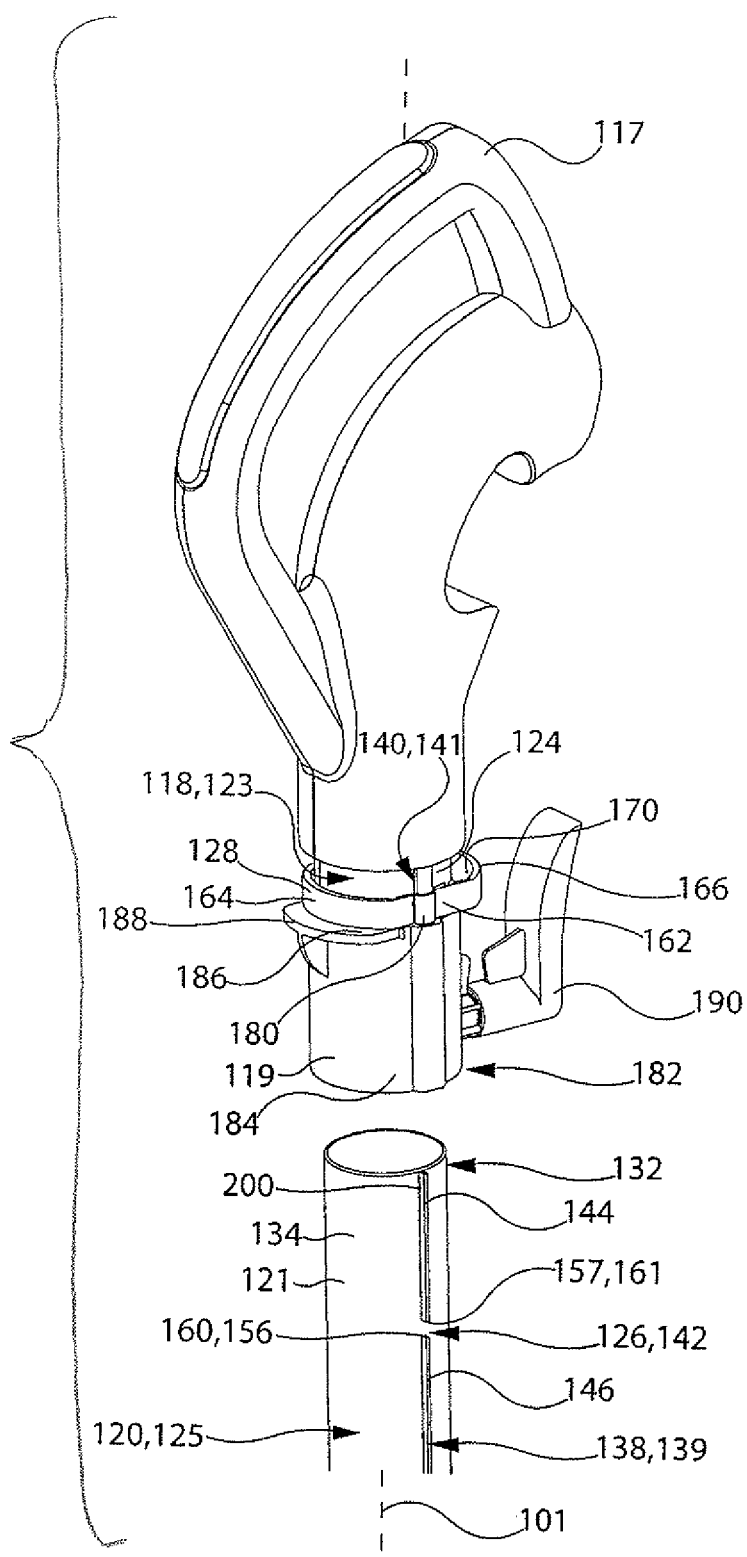
FIG. 3 is a perspective view of the first part, second part, and movable lock of FIG. 2, showing the lock in an unlocked position and the second part withdrawn from the first part.
Figure 4:
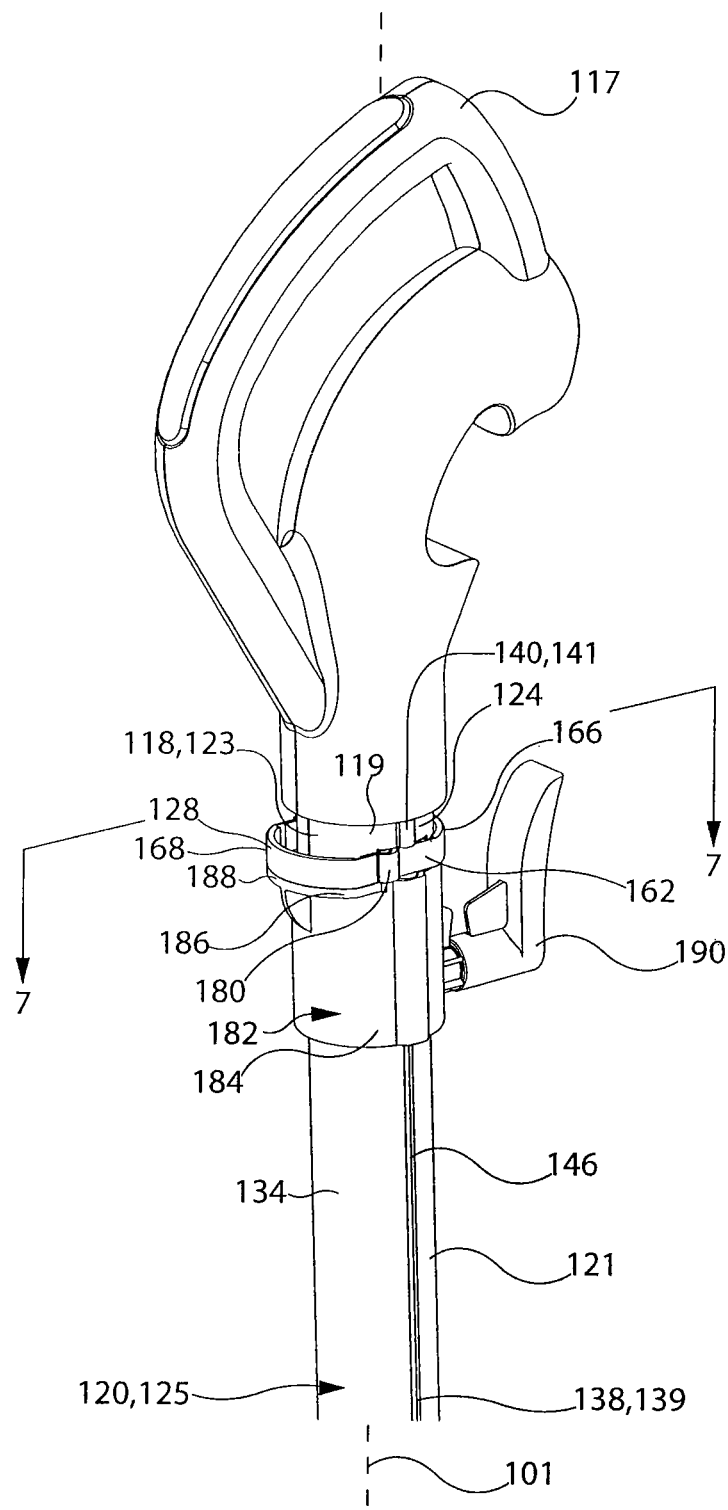
FIG. 4 is a perspective view of the first part, second part, and movable lock of FIG. 2, showing the lock in a locked position and the second part inserted into the first part.

Referring to FIGS. 2 to 4, in the embodiment shown, the first part 118 and the second part 120 each comprise a wall, 119, 121, respectively. The walls 119, 121 are each generally tubular, and extend along axis 101 to define longitudinally extending walls. The first part 118 is positionable over the second part 120. That is, as mentioned hereinabove, the second part 120 has an insertion portion 132. Further, the first part has a receiving portion 130. The insertion portion 132 of the second part 120 is insertable into the receiving portion 130 of the first part 118, so that the outer surface 134 of the second part is in facing relation with the inner surface 136 (shown in FIG. 6) of the first part.

It will be appreciated that the parts may have any particular cross-section and need not be round. For example, if they are square, then the parts themselves will act as an anti-rotation mechanism. It will also be appreciated that the parts may be of any diameter provided that the parts are structured such that the second part 120 is positioned to interact with the moveable lock 128 when the second part 120 is inserted into the first part 118. Further, the first part may have an opening extending all the way through such that first part 118 may be located at a position mid way along the length of the second part 120.

In embodiments wherein the first part 118 and/or the second part 120 form part of the airflow path, the insertion portion 132 of the second part 120 is preferably sized to be snugly and tightly received in the receiving portion 130 of the first part 118. Further, in such embodiments, a gasket, o-ring-bead, or other sealing member (not shown) may be provided between the outer surface 134 and the inner surface 136, to provide a seal in the fluid flow path. However, in the embodiment shown, wherein the first part 118 and the second part 120 do not form part of the airflow path, the second part 120 may be relatively loosely or non-sealingly received in the first part.

As exemplified, the second part 120 has an anti-rotation member 138, and the first part 118 has a mating anti-rotation member 140. When the first part 118 is positioned over the second part 120, the anti-rotation member 138 and the mating anti-rotation member 140 engage to prevent rotation of the second part 120 with respect to the first part 118, about axis 101.

Figure 7:
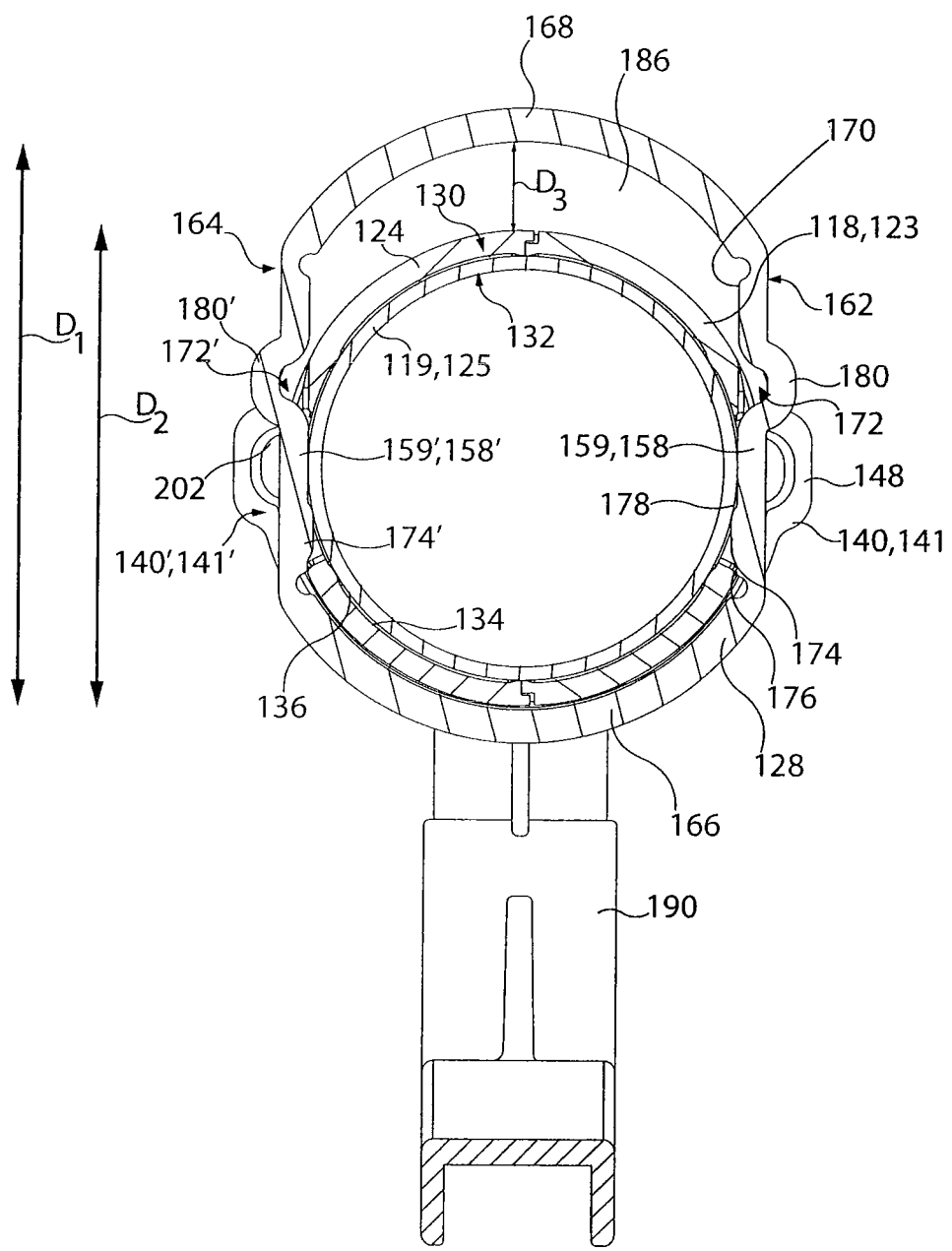
FIG. 7 is a cross section taken along line 7-7 in FIG. 4, showing the lock in the locked position.
Figure 10:
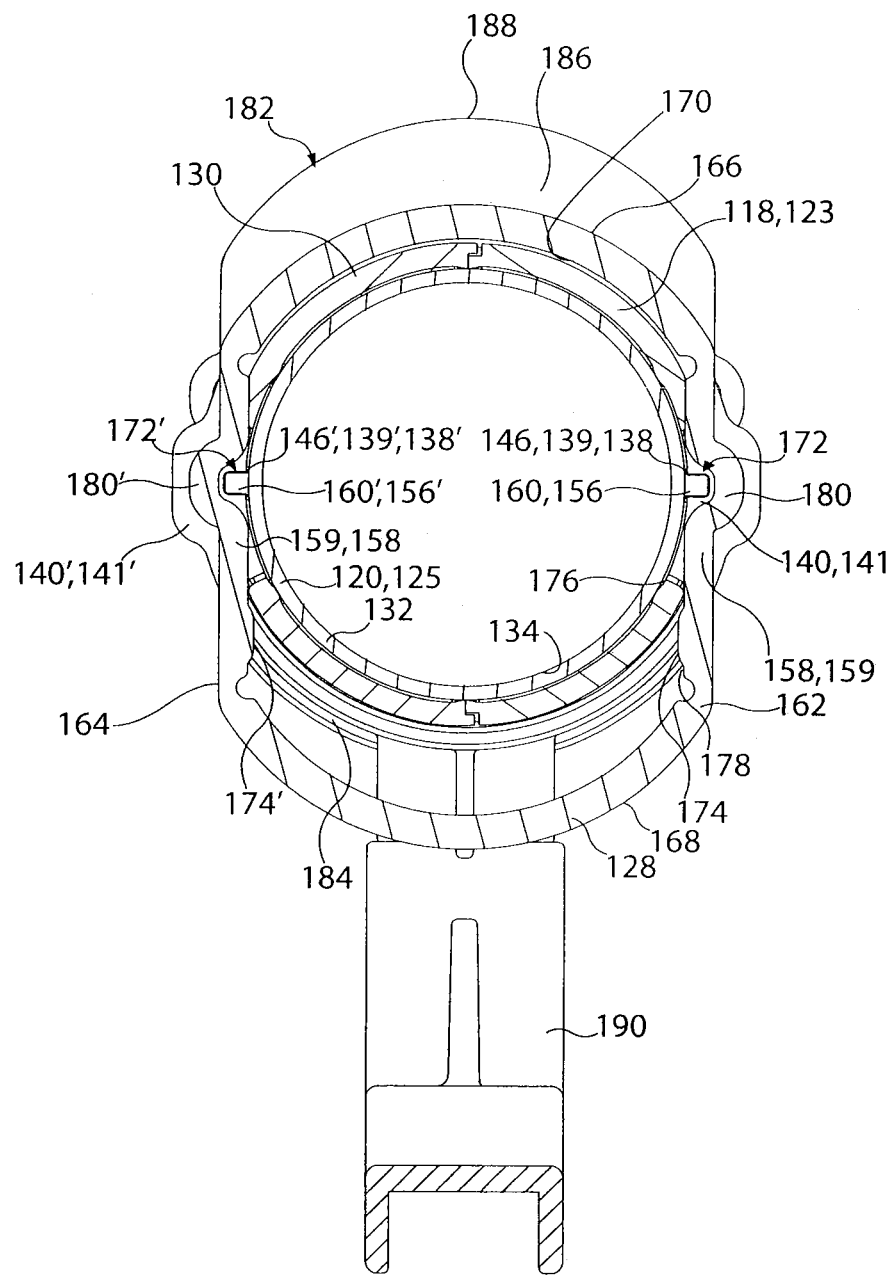
FIG. 10 is a cross section taken along line 7-7 in FIG. 4, showing the lock in the unlocked position; and, FIG. 11 is an enlarged view of the movable lock of FIG. 3.

In the exemplified embodiment, the second part 120 has an additional anti-rotation member 138', and the first part 118 has an additional mating anti-rotation member 140' (shown in FIGS. 7 and 10). The additional anti-rotation member 138' is spaced apart from the anti-rotation member 138 around the perimeter of the second part 120. For example, in the embodiment shown, the additional anti-rotation member 138' is spaced around the perimeter from the anti-rotation member 138 by about 180°. Further, the additional mating anti-rotation member 140' is similarly spaced apart from the mating anti-rotation member 140 around the perimeter of the first part 118. For example, as shown, the additional mating anti-rotation member 140' is spaced from the mating anti-rotation member 140 by about 180°, so that it is aligned with the additional anti-rotation member 138'.

It will be appreciated that in alternate embodiments, further additional anti-rotation members and mating anti-rotation members may be provided. For example, the second part 120 may comprise four anti-rotation members spaced about the perimeter thereof, and the first part 118 may comprise four mating anti-rotation members spaced about the perimeter thereof. Alternately, the second part 120 may comprise only one anti-rotation member, and the first part 118 may comprise only one mating anti-rotation member. If a plurality of anti-rotation members and mating anti-rotation members are provided, they may be spaced apart equally or by unequal spacing. Preferably two are used and are preferably on opposed sides, e.g., lateral sides, of the apparatus.

In the exemplified embodiment, the additional anti-rotation member 138' is substantially identical to the anti-rotation member 138, and the additional mating anti-rotation member 140' is substantially identical to the mating anti-rotation member 140. As such, only the anti-rotation member 138 and the mating anti-rotation member 140 will be described in detail, and similar reference numerals, with a prime suffix, will be used to label the features of the addition anti-rotation member 138' and additional mating anti-rotation member 140'. It will be appreciated that each pair of anti-rotation member and mating anti-rotation member may be the same or different.

Referring still to FIGS. 2 to 4, in the embodiment shown, the anti-rotation member 138 comprises a longitudinally extending spline 139 provided on the outer surface 134 of the second part 120. As shown, the spline 139 extends along the insertion portion 132 of the second part 120, generally parallel to axis 101. The spline 139 is preferably square in cross section, as shown, but may alternately be another shape, such as rounded, or triangular. The spline 139 may be of any suitable size. For example, the spline may have a length of about 2 cm to about 10 cm, and a cross sectional area of between about 1 mm² to about 1 cm².

Preferably, as shown, the spline 139 comprises a discontinuity 142. That is, as shown, the spline 139 comprises a first portion 144, and a second portion 146 that is collinear to the first portion 144 and spaced from the first portion 144 and distal to the end portion 132. The discontinuity 142 is a gap between the first portion 144 and the second portion 146. The discontinuity 142 provides a detent-receiving portion 126, which is used to lock the first part 118 to the second part 120, as will be described in greater detail herein below. The discontinuity 142 preferably has a longitudinal length $L_D$ that is approximately the same as the length $L_L$ of the moveable lock 128. It will be appreciated that if $L_D$ is substantially larger then $L_L$ then second part 120 may be longitudinally moveable within part 118 even with the moveable lock 128 is in the locked position.

Referring still to FIGS. 2 to 4, the mating anti-rotation member 140 comprises a mating recess 141 defined in the inner surface 136 of the first part 118 (see for example FIG. 7). As shown, the mating recess 141 extends along the receiving portion 130 of the first part 118, generally parallel to axis 101. The mating recess 141 is generally configured to receive the spline 139 when the second part 120 is inserted into the first part 118. When the spline 139 is received in the mating recess 141, rotation of the second part 120 with respect to the first part 118 about axis 101 is prevented, as the longitudinally extending sidewalls 200 of the spline 139 will abut the walls of the longitudinally extending sidewalls 202 of the mating recess 141 to oppose any rotational forces. Accordingly, when the second part 120 is inserted into the first part 118, the second part 120 is non-rotatably coupled to the first part 118.

It will be appreciated that, in alternate embodiments, the anti-rotation member and the mating anti-rotation member may be of any other configuration. The anti-rotation member and the mating anti-rotation member interact with each other to limit relative rotational motion between parts 118 and 120. It will be appreciated that the anti-rotation member and the mating anti-rotation member may be of any desired longitudinal length. For example, spline 139 need not extend from end 132 and recess 141 need only extend sufficiently far for part 120 to be inserted into part 118.

Referring still to FIGS. 2 to 4, as mentioned hereinabove, when the insertion portion 132 is inserted into the receiving portion 130, the insertion portion 132 may be locked to the receiving portion 130 by engaging the first detent member 157 of the insertion portion 132 with a second detent member 158 of a movable lock 128.

Referring to FIGS. 2, 3, and 6, in the embodiment shown, the first detent member 157 is provided by a portion of the spline 139. Specifically, the first detent member 157 comprises an end face 161 of the first portion 144 of the spline 139 and the detent member 156 comprises an end face 160 of the second portion 146 of the spline 139. In alternate embodiments, one or both detent members 156, 157 may be a separate member from the spline. For example, the first detent member may be a flange extending outwardly from the second part 120 (not shown).

Referring still to FIGS. 2, 3, 6, and 7, the second part 120 further comprises a detent-receiving portion 126, which is preferably between the detent members 156 and 157, and which slidably receives the second detent member 158 of the movable lock 128, so that the second detent member 158 may engage the detent members 156 and 157, as will be described further hereinbelow. The detent-receiving portion 126 preferably comprises a recess provided in or adjacent the outer surface 134 of the second part 120. For example, as shown, the detent-receiving portion 126 is a recess that is defined by the discontinuity 142 in the spline 139. In alternate embodiments, the recess may extend further inwardly into the wall 121 of the second part 120. In further alternate embodiments, the detent-receiving portion 126 may not be formed by the spline 139. For example, in some embodiments, a spline or other anti-rotation member may not be provided, and the detent-receiving portion 126 may be a recess defined in wall 121. Preferably, as shown, the recess 126 does not penetrate through the wall 121.

Referring to FIGS. 2, 6, 7, 9, and 10, the first part 118 comprises an opening 122. In the embodiment shown, the opening 122 is defined by an sidewalls 148, and extends through the wall 119 of the first part 118, perpendicular to axis 101. Preferably, as shown, the opening 122 is provided through the mating recess 141, such that the mating recess comprises a discontinuity. However, in alternate embodiments, for example wherein a mating recess 141 or other mating anti-rotation member 140 is not provided, the opening may not be provided through the mating recess 141.

When the first part 118 is positioned over the second part 120, and the anti-rotation 138 member engages the mating anti-rotation member 140, the opening 122 is rotationally aligned with the detent-receiving portion 126. That is, the position of the opening 122 about the circumference of the first part 118 is aligned with the position of the detent-receiving portion 126 about the circumference of the second part 120. In order to longitudinally align the opening 122 with the detent-receiving portion 126 (i.e. in a direction parallel to axis 101), a stop or other aligning member (not shown) may be provided, so that the insertion of the second part 120 into the first part 118 is stopped when the opening 122 is aligned with the detent-receiving portion 126. Alternately, the opening 122 and the detent-receiving portion 126 may be aligned manually, e.g., by visual inspection or by a marking placed on, e.g., the first part 118 at a location denoting the extent of the longitudinal insertion of the first part 118 into the second part 120 to align the opening 122 and the detent receiving portion 126.

When the opening 122 and the detent-receiving portion 126 are aligned longitudinally, the first detent member 157 is positioned inwardly of the opening 122. That is the first detent member 157 is inserted into the first part beyond the opening 122 such that, upon removal, the first detent member 157 must pass by opening 122.

Referring now to FIGS. 3 to 4, the movable lock 128 is slidably mounted on at least one of the first part 118 and the second part 120. In the embodiment shown, the movable lock 128 is mounted on an outer surface 124 of the first part 118, and is secured thereto. The manner in which the movable lock 128 is secured to the first part 118 will be described in further detail hereinbelow. The movable lock 128 is slidable at an angle to a longitudinal axis of the insertion portion 132, to lock the first part 118 to the second part 120. Specifically, as will be described in further detail hereinbelow, the movable lock 128 is slidable between a first or locked position, shown in FIGS. 5 to 7, whereby the first part 118 is locked with respect to the second part 120, and a second or unlocked position, shown in FIGS. 8 to 10, whereby the first part 118 is unlocked with respect to the second part 120. Preferably, the movable lock 122 is slidable at an angle perpendicular to the longitudinal axis 101.

Figure 11:
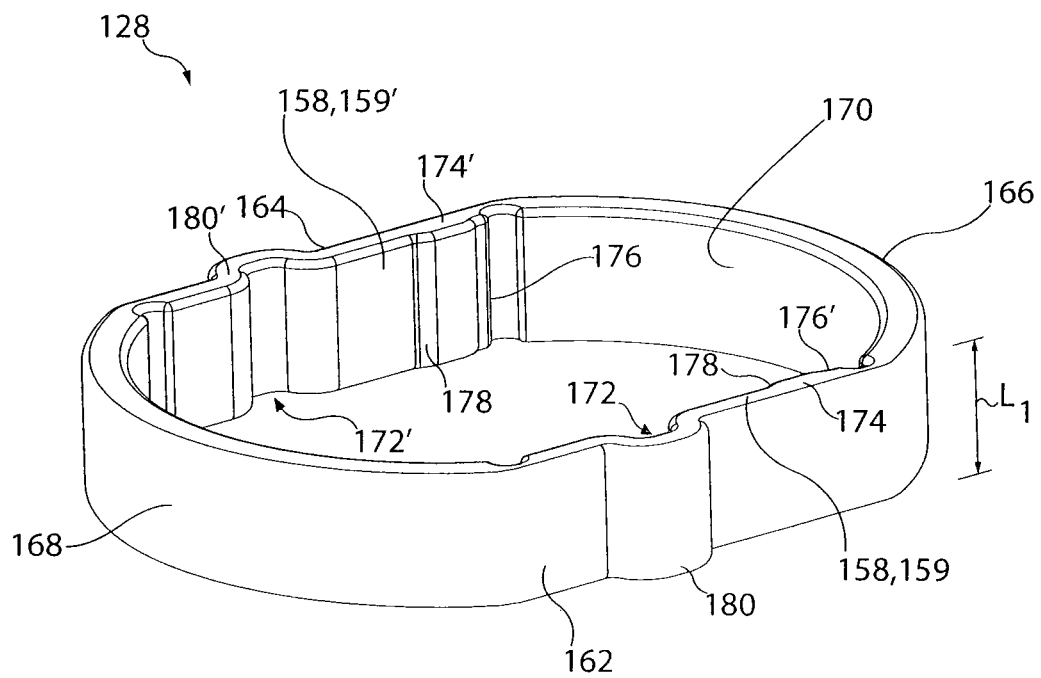

Preferably as exemplified in FIG. 11, the movable lock 128 is a generally annular band that is integrally formed and is sized to surround or fit over the first part 118. As exemplified in FIGS. 3 and 4, the movable lock 128 surrounds the first part 118 so as to overlie the opening 122. Accordingly, as the detent member 157 is positioned inwardly of the opening 122 when the insertion portion 132 is in the inserted position, the detent member 157 is positioned inwardly of the movable lock 128.

Figure 9:
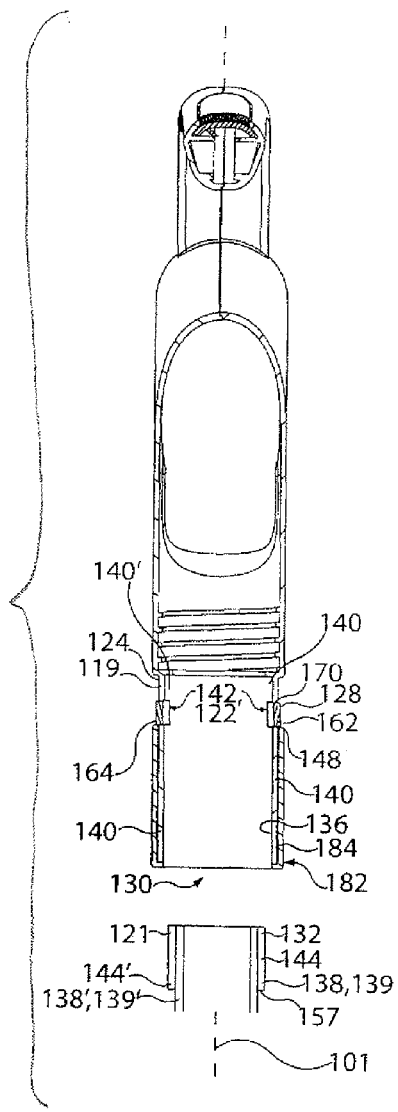
FIG. 9 is a cross section taken along line 9-9 in FIG. 8.
Figure 8:
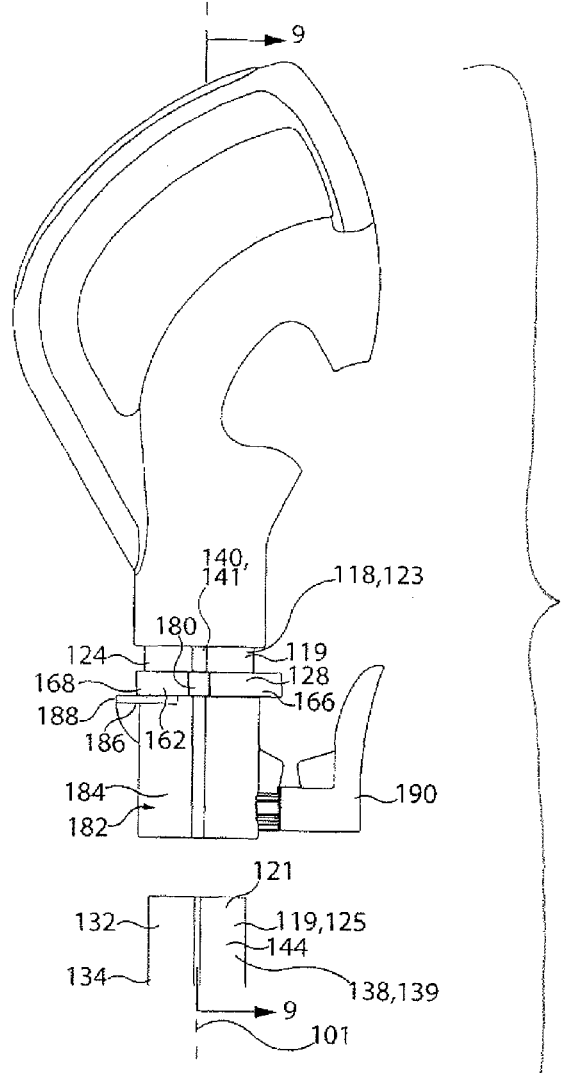
FIG. 8 is a side view of the first part, second part, and movable lock of FIG. 5, showing the lock in an unlocked position.

Referring now to FIGS. 3, 4, 7, 10, and 11, the movable lock comprises first 162 and second 164 opposed sides, and first 166 and second 168 opposed ends. The first 162 and second 164 opposed sides of the movable lock 128 are received tightly and snugly around the first part 118. However, the distance D1 between the inner surface of first opposed end 166 and the inner surface of second opposed end 168 is greater than the outer diameter D2 of the first part 118 (shown in FIG. 7). Accordingly, the movable lock may be slid back and forth such that in the first position (i.e. the locked position), as shown in FIGS. 5 to 7, the inner surface of first end 166 contacts the outer surface of the portion of first part 118 facing first end 166, and in the second position (i.e. the unlocked position), as shown in FIGS. 8 to 10, the inner surface of second end 168 contacts the outer surface of the portion of the portion of first part 118 facing second end 168. In order to move the lock 128 back and forth between the first and second position, a user may apply in inward lateral force and push one of the first end 166 and the second end 168 towards the axis 101, to move the one of the first end 166 and the second end 168 towards the first part 118. Accordingly, the first 166 and second 168 ends serve as first and second actuation portions.

Referring still to FIGS. 7, 10, and 11, as mentioned hereinabove, the movable lock 128 comprises a second detent member 158. The second detent member 158 is selectively positionable to interact with the detent member 157 to lock the first part to the second part. In the embodiment shown, the second detent member 158 comprises a generally straight portion 159 extending along the first side 162 of the movable lock. The generally straight portion 159 is off centre with respect to the lock 128, and is adjacent the first end 166 of the lock 128.

When the lock 128 is slid to the first position, as shown in FIGS. 5 to 7, such that the first end 166 of the lock 128 contacts the first part, the second detent member 158 is received in the opening 122. More specifically, as the opening 122 is defined in the mating recess 141, when the lock 128 is slid to the first position, the second detent member 158 seats within the opening 122 and the opening 122 through the mating recess 141, and blocks the linear passage of spline 139 along the mating recess 141. Further, as the opening 122 is aligned with the detent-receiving portion 126, which is formed by the gap between the first 144 and second 146 portions of the spline 139, the second detent member 158 is received in the detent-receiving portion 126 of the second part 120, and is positioned outwardly of the first detent member 157 and inwardly of the detent member 156 (i.e. the detent member 157 is inserted into the first part 118 past the second detent member 158). Accordingly, second detent member 158 is positioned between detent members 156 and 157. In this position the first part 118 may not be rotated with respect to the second part 120. Accordingly, second detent member 158 is retained in position between detent members 156 and 157. If an outward longitudinal force is applied to second part 120, the second detent member 158 blocks the mating recess 141, so that the first portion 144 of the spline 139 cannot be slid therethrough to remove the second part 120 from the first part 118. The detent member 157, which is formed by the end face 161 of the first portion 144 of the spline 139, interacts with and abuts the second detent member 158, to oppose the force. If an inward longitudinal force is applied to second part 120, the second detent member 158 blocks the mating recess 141, so that the first portion 144 of the spline 139 cannot be slid therethrough to further insert the second part 120 into the first part 118. The detent member 156, which is formed by the end face 160 of the second portion 146 of the spline 139, interacts with and abuts the second detent member 158, to oppose the force.

In order to unlock the movable lock 128, so that the second part 120 may be removed from the first part 118, the lock 128 may be slid to the second position, as shown in FIGS. 8 to 11, so that the second end 168 of the annular band contacts the first part 118. On the first side 162 of the annular band, adjacent the second detent member 158, the movable lock 128 comprises a portion 180 which defines a lock recess 172. The lock recess 172 is of similar cross sectional shape and size to the mating recess 141, so that it may permit the spline 139 to pass therethrough. When the lock 128 is in the first position, and the first part 118 is locked to the second part 120, the lock recess is laterally spaced from the mating recess 141. When the lock 128 is slid to the second position, the second detent member 158 is removed from the opening 122 and no longer occludes the mating recess 141, and the portion 180 is received in the opening so that the lock recess 172 is collinear with the mating recess 141. Accordingly, the mating recess 141 is no longer blocked, the spline 139 can be slid through the mating recess 141 and the lock recess 172 to remove the second part 118 from the first part 120, and the first detent member 157 does not interact with and abut the second detent member 158 to oppose the force.

As mentioned hereinabove, the movable lock 128 is secured to the first part 118. As can be seen in FIGS. 7 and 10, whether the lock 128 is in the first position or the second position, a portion of the lock 128 is received in the opening 122. For example, as mentioned hereinabove, when the lock is in the first position (i.e. is locked), the second detent member 158 is received in the opening 122. When the lock 128 is in the second position (i.e. is unlocked), the portion 180 of the lock 122 that defines the lock recess 172 is received in the opening 122. Longitudinal movement of the moveable lock 128 is blocked by sidewalls 148 and, in particular, by the opposed facing ends 204, 206 of mating anti-rotation member 140. By maintaining a portion of the lock 128 in the opening 122, the lock 128 is prevented from moving longitudinally (i.e. in a direction parallel to axis 101) on the first part 118, and is securely mounted to the first part 118. That is, whether the lock 128 is in the first position or the second position, if force is applied to move the lock 128 in a direction parallel to axis 101, the portion of the lock that is received in the opening 122 will abut the side-wall 148 of the opening 122, and oppose the force. It will be appreciated that moveable lock is preferably frictionally held in position on first part 118. However a groove or other guiding structure may be provided in lieu thereof or in addition thereto.

The movable lock 128 is preferably configured such that it may be snapped back and forth between the first position and the second position. For example, as can be seen in FIGS. 7, 10, and 11, the movable lock 128 comprises a tab 174, which is positioned adjacent the second detent member 158. The tab 174 has first 176 and second 178 opposed sides. When the movable lock 128 is in the first position, and the second detent member 158 is received in the opening 122, the tab 174 is also received in the opening 122, and the first side 176 of the tab 174 abuts the sidewall 148 of the opening 122, to maintain the second detent member 158 in the opening 122. As force is applied to push the lock 128 to the second position, the lock 128 will flex slightly. Eventually, if enough force is applied, the movable lock 128 will flex enough so that the tab 174 may slide past the sidewall 148 of the opening 122, and the lock 128 will snap to the second position, wherein the second end 168 of the movable lock 128 contacts the first part 118. When the lock 128 is in the second position, the second side 178 of the tab 174 will abut the outer wall 121 of the second part 122 to maintain the movable lock 128 in the second position. As force is applied to push the lock 128 to the first position, the lock 128 will flex slightly. Eventually, if enough force is applied, the lock 128 will flex enough so that the tab 174 may slide past the outer wall 121 of the second part 120, and the lock 128 will snap to the first position, wherein the first end 166 of the movable lock 128 contacts the first part 118. It will be appreciated that other constructions may be used to releasably retain, preferably mechanically retain, and more preferably mechanically retain without using any moving parts, moveable lock 128 in the locked and unlocked positions.

In the embodiment shown, the lock 128 comprises an additional second detent 158' and an additional lock recess 172' on the second side 164 of the lock. Further, the first part 118 comprises an additional opening 122', and the second part comprises additional detents 156' and 157', and detent-receiving portion 126'. The additional second detent 158' is insertable into the additional opening 122' and the additional detent-receiving portion 126', so that it interacts with the additional first detent 157', to further secure the first part 118 and the second part 120 together. In the embodiment shown, the additional second detent 158', additional opening 122', additional detent-receiving portion 126', and additional detents 156' and 157' are preferably substantially identical to the second detent 158, opening 122, detent-receiving portion 126, and the detents 156 and 157, and are therefore not described separately in detail herein. Alternately, they may be of differing constructions. If two such constructions are provided, they are preferably provided on opposed sides of part 118.

Referring back to FIGS. 3 and 4, the surface cleaning apparatus preferably further comprises one or more lock actuation blocker 182. The lock actuation blocker 182 prevents the lock 128 from being accidentally unlocked (i.e. slid to the second or unlocked position), or minimizes the risk of the lock 128 from being accidentally unlocked. In the embodiment shown, the lock actuation blocker 182 is provided on a sleeve 184 which is receivable on the first part 118, below and adjacent the lock 128, and is secured, e.g., frictionally secured, to the first part 118. Sleeve 184 may alternately be held in position by any other means including a mechanical fastener, an adhesive of the like. In alternate embodiments, the lock actuation blocker 182 may be provided on first part 118, such as at a location immediately above opening 122. The lock actuation blocker 182 is positioned and configured to prevent a person operating moveable lock 128 unintentionally. Accordingly, any fixed surface located at the outward extent of moveable lock 128 and adjacent the upper and/or lower surface of moveable lock 128 could be utilized.

The sleeve 184 comprises a flange 186 extending outwardly therefrom, and positioned below and adjacent the lock 128. When the lock 128 is in the first position, and the first end 166 of the lock 128 contacts the first part 118, the second end 168 of the lock 128 is spaced a distance D3 from the first part (shown in FIG. 7). The flange 186 is sized and positioned such that the outer edge 188 thereof is also spaced a distance D3 from the first part, and is aligned with the second end 168 of the lock. Accordingly, if accidental contact is made with the handle extension 113, and force is applied to the region of the lock 128, the force will be absorbed by the flange 186, and will not cause the lock 128 to move to the second position. It will be appreciated that outer edge 188 of flange 186 may extend outwardly of the distance D3 from the first part.

In the embodiment shown, the sleeve 184 further comprises a cord-reel 190, around which an electrical cord of the surface cleaning apparatus may be wound.

In use, the lock 128 may be positioned on the first part 118 in the second (i.e. unlocked) position, so that the lock recess 172 is collinear with the mating recess 141, as shown in FIG. 3. Further, the lock actuation blocker 182 may be positioned on the first part 118. The second part 120 may be inserted into the first part 118, so that the spline(s) 139 is/are received in the mating recess(es) 141. The second part 120 is inserted into the first part 118 until the first portion 144 of the spline(s) 139, which provides the detent member(s) 157, is/are slid through and past the lock recess(es) 172, so that the detent member(s) 157 is/are inward of the opening(s) 122, and the detent-receiving portion(s) 126 is/are aligned with the opening(s) 122. The lock 128 may then be slid to the second position, as shown in FIG. 4, so that the second detent member(s) 158 is/are received in the opening(s) 122 and the detent-receiving portion(s) 126, the mating recess(es) 141 are blocked by the second detent member(s) 158, and the second detent member(s) 158 engage the first detent member(s) 157. If force is applied to remove the second part 120 from the first part 118, the first detent member(s) 157 will interact with and abut the second detent member(s) to oppose the force and maintain the second part 120 secured to the first part 118.

It will be appreciated that certain features of the invention, which are, for clarity, described in the context of separate embodiments or separate aspects, may also be provided in combination in a single embodiment. Conversely, various features of the invention, which are, for brevity, described in the context of a single embodiment or aspect, may also be provided separately or in any suitable sub-combination.

Although the invention has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

The invention claimed is:

1. A surface cleaning apparatus comprising:
   (a) a first part comprising a longitudinal wall having an opening;
   (b) a second part comprising a fluid flow conduit having an insertion portion slidably insertable into the first part to define an inserted position, the insertion portion comprising a longitudinal axis, a spline, a first detent member that is a portion of the spline, and a recess, and wherein the second part is non-rotatably mounted to the first part when the second part is inserted into the first part; and
   (c) a movable lock slidably mounted on at least one of the first part and the second part and laterally slidable along a lateral axis transverse to the longitudinal axis of the insertion portion, the movable lock having first and second opposed ends and spaced apart lock sidewalls extending between the first and second ends, one of the sidewalls having a second detent member provided thereon, wherein at least a portion of the movable lock is slideable across the opening as the movable lock is moved from a locked position in which the second detent member extends through the opening and into the recess and engages the first detent member to an unlocked position in which the second detent member does not interact with the first detent member;

wherein the first detent member is positioned inwardly of the second detent member when the insertion portion is in the inserted position and the lock is in the unlocked position, and the second detent member is selectively positionable to interact with the first detent member to lock the first part to the second part when the insertion portion is in the inserted position.

2. The domestic apparatus of claim 1, wherein the movable lock is slidably mounted on the first part.

3. The domestic apparatus of any of claims 1 to 2, wherein the movable lock is slidably mounted on an outer surface of the first part.

4. The domestic apparatus of claim 1, wherein the second part comprises a wall having an outer surface, the recess provided in or adjacent the outer surface.

5. The domestic apparatus of any of claims 1 to 2 wherein the second part has an outer surface having the spline provided thereon and the first part has an inner surface having a mating recess.

6. The domestic apparatus of claim 1, wherein the spline comprises a first portion and a collinear second portion and the recess is located therebetween, and an end face of the first portion provides the first detent member.

7. The domestic apparatus of claim 6 wherein a mating anti-rotation member in the form of a recess for mating with the spline is defined in an inner surface of the first part.

8. The domestic apparatus of claim 7 wherein the movable lock comprises a lock recess collinear with the mating recess when the movable lock is in the second position.

9. The domestic apparatus of claim 8, wherein when the movable lock is in the locked position, the lock recess is laterally spaced from the mating recess, and the second detent member is aligned with the mating recess.

10. The domestic apparatus of claim 8, wherein the lock recess is adjacent the second detent member.

11. The domestic apparatus of any of claims 1 to 2, wherein the moveable lock comprises an annular band wherein the first and second opposed ends are rounded and the lock sidewalls comprise linear portions.

12. The domestic apparatus of any of claims 1 to 2, wherein the moveable lock comprises first and second opposed actuation portions.

13. The domestic appliance of claim 12, wherein the moveable lock is slidable laterally in a first direction for movement of the moveable lock from the locked position to the unlocked position and the moveable lock is slidable laterally in the opposite direction for movement of the moveable lock from the unlocked position to the locked position.

14. The domestic apparatus of any of claims 1 to 2, wherein the first part comprises a lock actuation blocker.

15. The domestic apparatus of claim 14, wherein the lock actuation blocker comprises a flange adjacent the movable lock and having an outer edge adjacent an end of the movable lock when the movable lock is in the locked position.

16. A surface cleaning apparatus comprising:
(a) a first part having a recess and an opening;
(b) a second part comprising a fluid flow conduit having an insertion portion comprising a longitudinal axis and longitudinally slidably insertable into the first part to define an inserted position, the insertion portion comprising a longitudinally extending spline provided on an outer surface of the second part and mateable with the recess of the first part to inhibit rotation of the second part relative to the first part, the second part also having a recess; and
(c) a movable lock laterally slidably mounted on the first part along a lateral axis transverse to the longitudinal axis of the insertion portion, the movable lock having a detent member and a lock recess;
wherein, when the second part is in the inserted position, the movable lock is movable between a locked position wherein the detent member extends through the opening and into the recess on the second part and interacts with the spline whereby longitudinal movement of the second part relative to the first part is inhibited thereby locking the first part to the second part, and an unlocked position wherein a lock recess is collinear with the recess of the first part thereby enabling longitudinal movement of the second part relative to the first part.

* * * * *